United States Patent
Nedic et al.

(10) Patent No.: US 6,563,841 B1
(45) Date of Patent: May 13, 2003

(54) PER-BIN ADAPTIVE EQUALIZATION IN WINDOWED DMT-TYPE MODEM RECEIVER

(75) Inventors: Slobodan Nedic, Plainsboro, NJ (US); Nenad Popovic, Plainsboro, NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/452,570

(22) Filed: Dec. 1, 1999

Related U.S. Application Data (60) Provisional application No. 60/151,467, filed on Aug. 30, 1999.

(51) Int. Cl.$^7$ ............................................... H04L 27/28
(52) U.S. Cl. ...................... 370/480; 370/210; 375/222; 375/260; 375/349; 375/350
(58) Field of Search ................................. 370/210, 480, 370/276, 282, 493, 517; 375/222, 229–232, 230, 231, 260, 316, 346

(56) References Cited

U.S. PATENT DOCUMENTS

| | | | | |
|---|---|---|---|---|
| 6,366,554 B1 | * | 4/2002 | Isaksson et al. ............. | 370/206 |
| 6,389,062 B1 | * | 5/2002 | Wu .............................. | 375/222 |
| 6,396,886 B1 | * | 5/2002 | Kapoor ........................ | 375/350 |
| 6,438,161 B1 | * | 8/2002 | Farhang-Boroujeny et al. .......................... | 375/229 |

* cited by examiner

Primary Examiner—Ricky Ngo
Assistant Examiner—Yvonne Q. Ha
(74) Attorney, Agent, or Firm—Ostrolenk, Faber, Gerb & Soffen, LLP (57) ABSTRACT

An apparatus for receiving a discrete multi-tone (DMT) signal representative of a series of input symbols and including a plurality of orthogonal sinusoidal subchannels of finite length for each input symbol, the apparatus including a plurality of delay circuits, each operable to receive the DMT signal and produce a delayed DMT signal; a plurality of windowing circuits, each operable to receive a respective one of the delayed DMT signals and produce a windowed DMT signal; at least one finite duration fast Fourier transform (FFT) circuit, operable to receive the windowed DMT signals and produce respective complex signals representing a plurality of bins corresponding to the subchannels of the DMT signal; a plurality of multiplier circuits, each operable to produce a product of (i) a complex factor for compensating for a respective phase shift introduced by a corresponding one of the delay circuits, and (ii) a respective one of the complex signals; an equalizer circuit operable to receive the products from the plurality of multiplier circuits and produce a partial response signaling (PRS) coded signal; and a PRS decoder operable to receive the PRS coded signal and produce output symbols representative of the input symbols.

33 Claims, 9 Drawing Sheets

PER-BIN ADAPTIVE EQUALIZATION IN WINDOWED DMT-TYPE MODEM RECEIVER

CROSS REFERENCE TO RELATED APPLICATION

This application is based on and claims priority to U.S. Provisional Patent Application No. 60/151,467, entitled "PER-BIN ADAPTIVE EQUALIZATION IN WINDOWED DMT-TYPE MODEM RECEIVER," filed Aug. 30, 1999, the entire disclosure at which is hereby incorporated by reference.

BACKGROUND OF THE INVENTION

1. Field of the Invention

The present invention relates to the use of an equalizer algorithm and/or apparatus in a discrete multi-tone transceiver (DMT) and, more particularly, to an adaptive equalizer algorithm and/or apparatus which operates on each bin individually as an alternative to using a time domain equalizer (TEQ) in digital subscriber line (xDSL) transceivers.

2. Related Art

The fast, efficient and error-free transmission of digital information from one point to another has become increasingly important. Many communications systems exist which permit digital information to be transmitted over various types of communication channels, such as wireless channels, fiber-optic channels, and wire line channels.

The present invention will be described in the context of a wire line communications channel, such as a telephone line which utilizes a twisted pair of copper wires. It is noted that the use of the present invention is not limited to wire line systems as those skilled in the art will appreciate from the discussion hereinbelow.

A modem is typically used to transmit and receive digital data over a telephone line. Modems employ a modulator to transmit the digital data over the telephone line and a demodulator to receive digital data from the telephone line. One common modulation technique is known as digital multi-tone modulation which requires a discrete multi-tone transmitter and a discrete multi-tone receiver at each modem in a communication system. Often, those skilled in the art refer to such modems as employing a DMT physical layer modulation technique.

Figure 1:
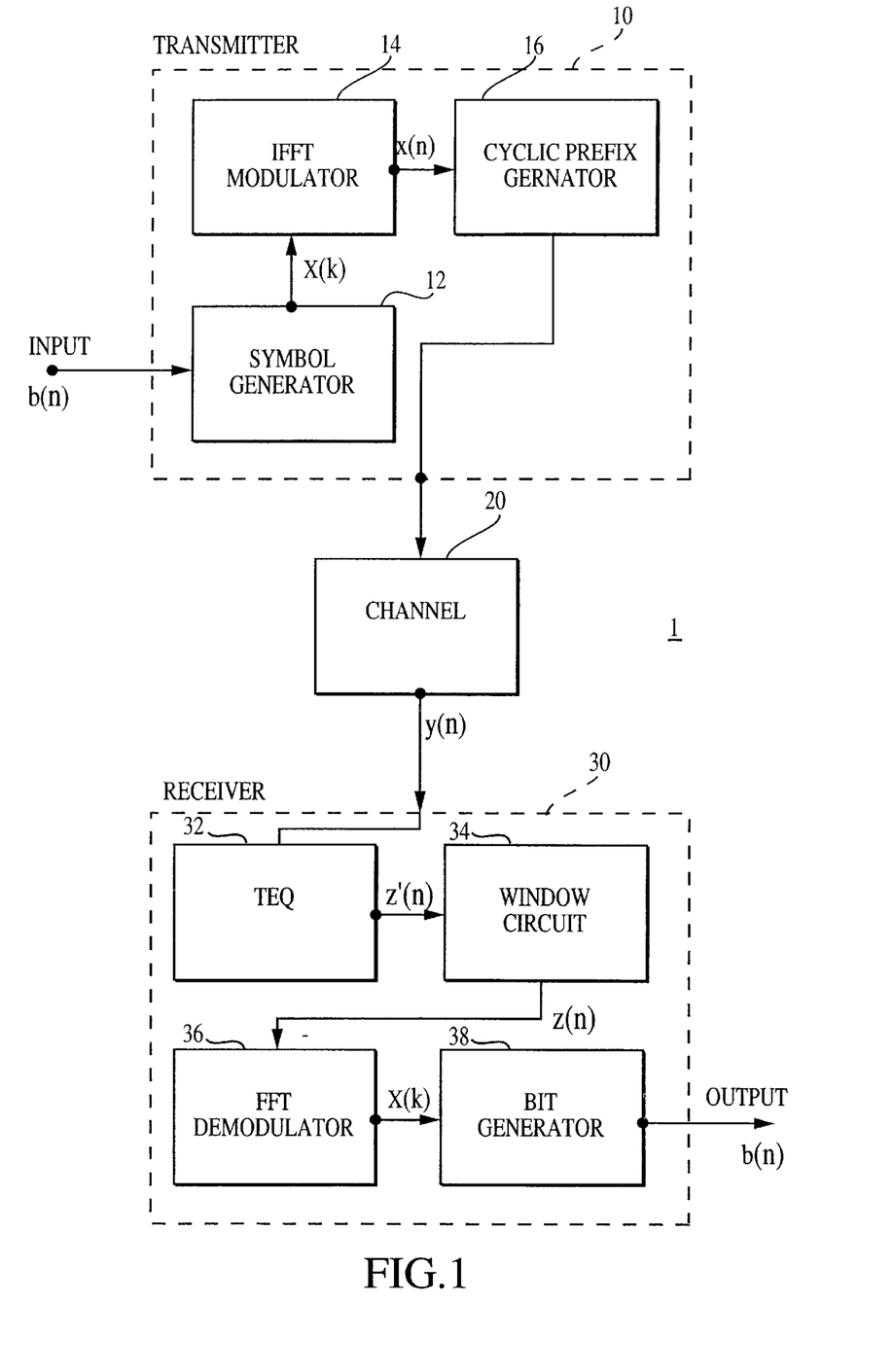
FIG. 1 is a block diagram illustrating a discrete multi-tone communications system according to the prior art.

Reference is now made to FIG. 1 which is a block diagram of a conventional DMT communications system 1. The system 1 includes a DMT transmitter 10, a transmission channel 20, and a DMT receiver 30. The DMT transmitter 10 includes a symbol generator 12, an inverse fast Fourier transform (IFFT) modulator 14, and a cyclic prefix generator 16. The DMT transmitter 10 receives an input bit stream b(n) which is fed into the symbol generator 12. The symbol generator 12 produces a signal vector X(k) which is fed into the IFFT modulator 14. X(k) is a complex signal vector (i.e., a signal understood by those skilled in the art to comprise both real and an imaginary components of quadrature amplitude modulation QAM data symbols) formed by mapping pairs of bits of the input bit stream b(n) into a complex data space such that the complex signal vector X(k) has a length of N/2 samples. Symbol generator 12 also augments the complex signal vector X(k) with a complex conjugate (of the N/2 samples) to obtain a conjugate symmetric signal of N samples.

The IFFT modulator 14 performs an N-point inverse fast Fourier transform on the complex signal vector X(k) to obtain the sampled real signal x(n). Since X(k) is a Hermitian type symmetric signal vector, the output of the IFFT modulator 16 is a real signal x(n). The real signal x(n) may be thought of as the summation of a plurality of cosine functions each having a finite length and a different frequency, phase, and amplitude, where these frequencies are multiples of a fundamental frequency. Since each of the cosine functions has a finite duration, x(n) is a varying amplitude discrete signal having a finite duration spanning N samples. Those skilled in the art will appreciate that the frequency spectrum of x(n) may be thought of as a plurality of orthogonal (SIN·X)/(X) functions, each centered at a respective one of the frequencies of the cosine functions of x(n).

Figure 2:
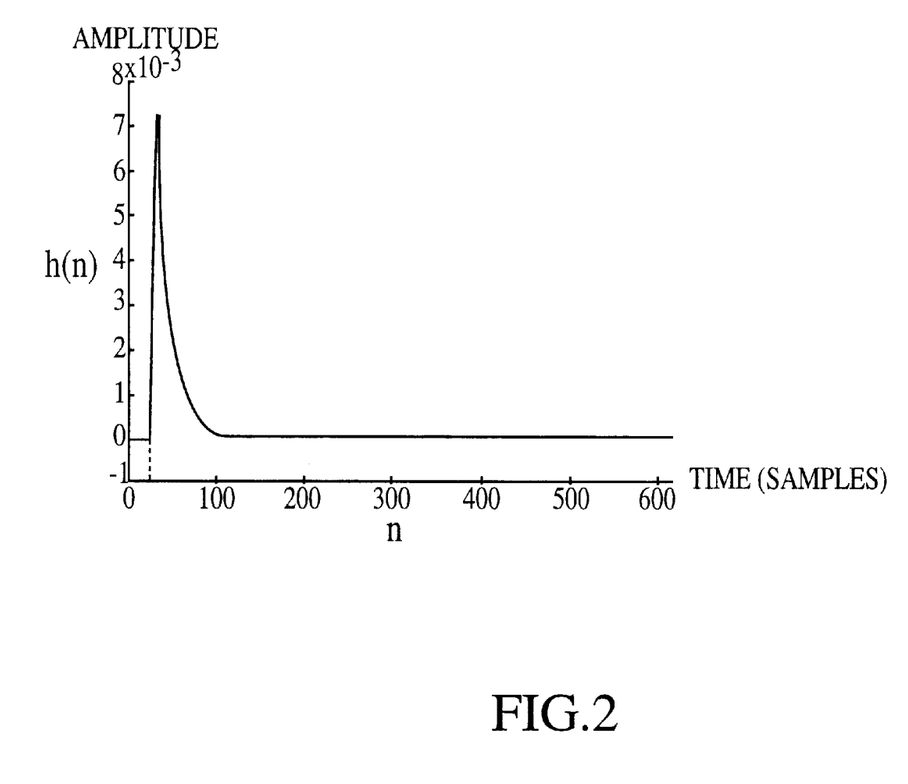
FIG. 2 is a graph showing the impulse response of a typical twisted pair telephone communications channel.

Those skilled in the art will appreciate that the transmission channel 20 includes a D/A converter (not shown), transmit filter (not shown), a receive filter (not shown), and an A/D converter (not shown) on either end of a wire loop (not shown).

x(n) is transmitted over the channel 20 to the DMT receiver 30. Since the transmission channel 20 has a non-ideal impulse response h(n), the received signal r(n) will not exactly match x(n). Instead, r(n) will be a function of the convolution of x(n) and h(n). Typically, h(n) will look substantially like the curve shown in FIG. 2. The non-ideal characteristic of h(n) introduces an amount of interference (specifically inter-symbol and inter-channel interference) which should be compensated for in both the DMT transmitter 10 and the DMT. receiver 30.

A common technique in compensating for the non-ideal impulse response of the transmission channel 20 is to introduce a so-called guard band at the beginning of each finite duration signal x(n) to produce x'(n). The cyclic prefix generator 16 performs this function. The guard band is typically formed of the last V samples of x(n) for each DMT symbol. If the length of the impulse response h(n) of the transmission channel 20 is less than or equal to V+1, then the guard band of length V will be sufficient to eliminate the interference cause by the impulse response h(n). The guard band is commonly referred to in the art as a "cyclic prefix" (CP).

Unfortunately, the impulse response h(n) of a typical transmission channel 20 may be excessively long, requiring cyclic prefix lengths which substantially reduce the rate at which digital bits are transmitted across the transmission channel 20. The DMT receiver 30, therefore, employs signal processing techniques which effectively shorten the impulse response h(n) of the transmission channel 20, thereby permitting a corresponding reduction in the length of the cyclic prefix required at the DMT transmitter 10.

The DMT receiver 30 includes a time-domain equalizer (TEQ) 32, a windowing circuit 34, a fast Fourier transform (FFT) demodulator 36, and a bit generator 38. The time-domain equalizer 32 is a finite impulse response (FIR) filter designed to compensate for the non-ideal impulse response h(n) of the transmission channel 20. In particular, the time-domain equalizer 32 employs a finite number of coefficients which are calculated to compensate for the non-ideal impulse response of the transmission channel 20. The time domain equalizer 32 operates on the impulse response h(n) of the channel 20 such that the combined impulse response $h_{eff}(n)$ of the channel 20 and the time domain equalizer 32 has a maximum of energy within a limited band (or set) of consecutive samples. This may be thought of as "shortening" the effective impulse response of the channel 20. The output of the time domain equalizer is z'(n).

A rectangular windowing circuit 34 is employed to remove the cyclic prefix from z'(n) to obtain z(n). Non-rectangular windowing circuits have also been employed in the prior art to improve frequency spectral containment. The signal z(n) is input into the FFT demodulator 36 (which is understood to include a frequency domain equalizer function) to produce the complex symmetric signal vector X(k). After (i) the complex conjugate portion of the signal vector X(k) is removed, and (ii) compensation of non-rectangular windowing has been accomplished, the bit generator 38 maps the complex signal vector X(k) into an output bit stream b(n), which theoretically matches the input bit stream b(n).

Several algorithms exist for calculating the T coefficients of the time-domain equalizer 32. One such algorithm is referred to as the least squares based pole zero cancellation algorithm, which is discussed in detail in P. J. Melsa, R. Y. Younce and C. E. Rohrs, "Impulse Response Shortening for Discrete Multitone Transceivers," *IEEE Trans. On Comm.* Vol. 44, No. 12, pp. 1662–71, December 1996. Another such algorithm is referred to as the optimal shortening algorithm which is also discussed in detail in the above referenced IEEE publication. Still another algorithm is referred to as the eigenvector approach using the power method which is discussed in detail in M. Nafie and A. Gatherer, "Time-Domain Equalizer Training for ADSL," *Proc. ICC*, pp. 1085–1089 (1997). Yet another algorithm is disclosed in U.S. patent application Ser. No. 07/249,530, entitled "IMPROVED DMT TIME DOMAIN EQUALIZER ALGORITHM, filed Feb. 12, 1999, the entire disclosure of which is hereby incorporated by reference.

Although the above techniques for calculating the coefficients of the time-domain equalizer 32 address the issue of "shortening" the effective impulse response of the transmission channel 20, they do not address the problem of adaptively tracking changes in the transfer function of the communication channel 20 over time and any time variant positioning of narrow band interference sources. Furthermore, these techniques are relatively complex and controllability thereof is non-trivial. Still further, some of these techniques result in an increase in interference due to additive noise coloring in the received signal.

Accordingly, there is a need in the art for an improved DMT communication system which is capable of (i) adaptively compensating for time variations in the communications channel transfer function; (ii) compensating for inter and intra bin interference; and (iii) adaptive notching narrow-band radio frequency interference from the received DMT signal; and (iv) reduced complexity optimal decoding of non-rectangular windowing induced inter-bin (inter subchannel) interference.

SUMMARY OF THE INVENTION

In order to overcome the deficiencies in the prior art, the present invention provides an apparatus for receiving a discrete multi-tone (DMT) signal representative of a series of input symbols and including a plurality of orthogonal sinusoidal subchannels of finite length for each input symbol, the apparatus comprising: a plurality of delay circuits, each operable to receive the DMT signal and produce a delayed DMT signal; a plurality of windowing circuits, each operable to receive a respective one of the delayed DMT signals and produce a windowed DMT signal; at least one finite duration fast Fourier transform (FFT) circuit, operable to receive the windowed DMT signals and produce respective complex signals representing a plurality of bins corresponding to the subchannels of the DMT signal in time shared fashion; a plurality of multiplier circuits, each operable to produce a product of (i) a complex factor for compensating for a respective phase shift introduced by a corresponding one of the delay circuits, an equalizer circuit operable to receive the products from the plurality of multiplier circuits and produce a partial response signaling (PRS) coded signal; and a PRS decoder operable to receive the PRS coded signal and produce output symbols representative of the input symbols.

Preferably, the apparatus further comprises 1, 2, 3, through (K−1) delay circuits, wherein one of the windowing circuits is operable to receive the DMT signal which has not been delayed. More particularly, it is preferred that the DMT signal includes N samples spaced To/N seconds apart representing each input symbol, and each delay circuit delays the DMT signal by a respective multiple of 1, 2, 3, through (K−1) times To/K. Alternatively, the DMT signal may include N samples representing each input symbol and V samples representing a cyclic prefix for each input symbol, the N+V samples being spaced Ts/(N+V) seconds apart, and each delay circuit delays the DMT signal by a respective multiple of 1, 2, 3, through (K−1) times Ts/K.

It is preferred that each of the windowing circuits is a Hanning type window.

It is also preferred that active bins of the FFT circuit are input into respective ones of the multiplier circuits and multiplied by a respective one of the complex factors.

Preferably, the equalizer circuit is operable to sequentially receive k-th products from the multiplier circuits of k-th bins to produce an over sampled signal for a k-th one of the subchannels of the DMT signal. The equalizer circuit may be a linear circuit comprising: a finite impulse response feed forward filter (FFF) having K*L aggregated taps and being operable to receive the over sampled signal and produce a forward filtered signal; a multiplier circuit operable to produce the PRS coded signal by multiplying (i) a complex factor for compensating for a cyclic prefix of each symbol, and (ii) the forward filtered signal; a PRS slicer circuit operable to receive the PRS coded signal and produce PRS signal levels for each bin; and a first summing circuit operable to produce an error signal corresponding to a difference of the PRS coded signal and the PRS signal levels, the error signal being used to adaptively produce coefficients for the taps of the FFF.

The equalizer circuit preferably also includes an adaptive circuit operable to produce FFF coefficients during a training phase, the adaptive circuit comprising a PRS coding circuit operable to receive a training signal of known symbols to produce a training PRS coded signal, wherein the summing circuit is operable to produce an error signal corresponding to a difference of the training PRS coded signal and the PRS coded signal at the output of the FFF, the error signal being used to adaptively produce the FFF coefficients for the taps of the FFF. It is most preferred that the adaptive circuit is operable to produce the FFF coefficients intermittently.

The equalizer circuit may alternatively be a non-linear circuit comprising: a finite impulse response feed forward filter (FFF) having a plurality of aggregated taps and being operable to receive the over sampled signal and produce a forward filtered signal; a multiplier circuit operable to produce a phase shifted signal by multiplying (i) a complex factor for compensating for a cyclic prefix of each symbol, and (ii) the forward filtered signal; a first summing circuit operable to produce a difference signal corresponding to a difference of the phase shifted signal and a feedback filtered signal; a PRS slicer circuit operable to receive the difference signal and produce PRS signal levels for each bin; a finite impulse response feed back filter (FBF) having a plurality of aggregated taps and being operable to receive the PRS signal levels and produce the feedback filtered signal; and a second summing circuit operable to produce an error signal corresponding to a difference of the difference signal and the PRS signal levels, the error signal being used to adaptively produce the coefficients for the taps of the FFF and the FBF.

The equalizer circuit also preferably includes an adaptive circuit operable to produce FFF coefficients and FBF coefficients during a training phase, the adaptive circuit comprising a PRS coding circuit operable to receive a training signal of known symbols to produce a training PRS coded signal, wherein the second summing circuit is operable to produce an error signal corresponding to a difference of the difference signal and the PRS coded signal, the error signal being used to adaptively produce the FFF coefficients for the taps of the FFF and the FBF coefficients for the taps of the FBF.

The equalizer circuit may alternatively be a non-linear circuit which includes decision feedback, the equalizer circuit comprising: a finite impulse response feed forward filter (FFF) having a plurality of aggregated taps and being operable to receive the over sampled signal and produce a forward filtered signal; a multiplier circuit operable to produce a phase shifted signal by multiplying (i) a complex factor for compensating for a cyclic prefix of each symbol, and (ii) the forward filtered signal; a first summing circuit operable to produce a difference signal corresponding to a difference of the phase shifted signal and an aggregate feedback filtered signal; a PRS slicer circuit operable to receive the difference signal and produce PRS signal levels for each bin; a first finite impulse response feed back filter (FBF) having a plurality of aggregated taps and being operable to receive the PRS signal levels for a k-th bin and produce a first feedback filtered signal; a second FBF having a plurality of aggregated taps and being operable to receive the PRS signal levels for a (k−1)th bin and produce a second feedback filtered signal; a third FBF having a plurality of aggregated taps and being operable to receive the PRS signal levels for a (k+1)th bin and produce a third feedback filtered signal; a second summing circuit operable to produce the aggregate filtered feedback signal by summing the first, second, and third feedback filtered signals; and a third summing circuit operable to produce an error signal corresponding to a difference of the difference signal and the PRS signal levels, the error signal being used to adaptively produce the coefficients for the taps of the FFF and the first, second, and third FBFs.

It is most preferred that the PRS decoder includes at least one of (i) a decision feedback decoder; (ii) a maximum likelihood sequence estimator; and (iii) a Viterbi decoder.

According to another aspect of the present invention, the invention provides an apparatus for receiving a discrete multi-tone (DMT) signal representative of a series of input symbols and including a plurality of orthogonal sinusoidal subchannels of finite length for each input symbol, the apparatus comprising: a plurality of delay circuits, each operable to receive the DMT signal and produce a delayed DMT signal; at least one (time-shared) finite length fast Fourier transform (FFT) circuit, operable to receive the delayed DMT signals and produce respective complex signals representing a plurality of bins corresponding to the subchannels of the DMT signal; a plurality of frequency domain windowing circuits, each operable to receive a respective one of the complex signals and produce a windowed complex signal; a plurality of multiplier circuits, each operable to produce a product of (i) a complex factor for compensating for a respective delay circuit, and (ii) a respective one of the windowed complex signals; an equalizer circuit operable to receive the products from the plurality of multiplier circuits and produce a partial response signaling (PRS) coded signal; and a PRS decoder operable to receive the PRS coded signal and produce output symbols representative of the input symbols.

Other features and advantages of the present invention will become apparent from the following description of the invention which refers to the accompanying drawings.

BRIEF DESCRIPTION OF THE DRAWING

For the purpose of illustrating the invention, there are shown in the drawing forms which are presently preferred, it being understood, however, that the invention is not limited to the precise arrangements and/or instrumentalities shown.

DETAILED DESCRIPTION OF EMBODIMENTS OF THE INVENTION

Figure 3:
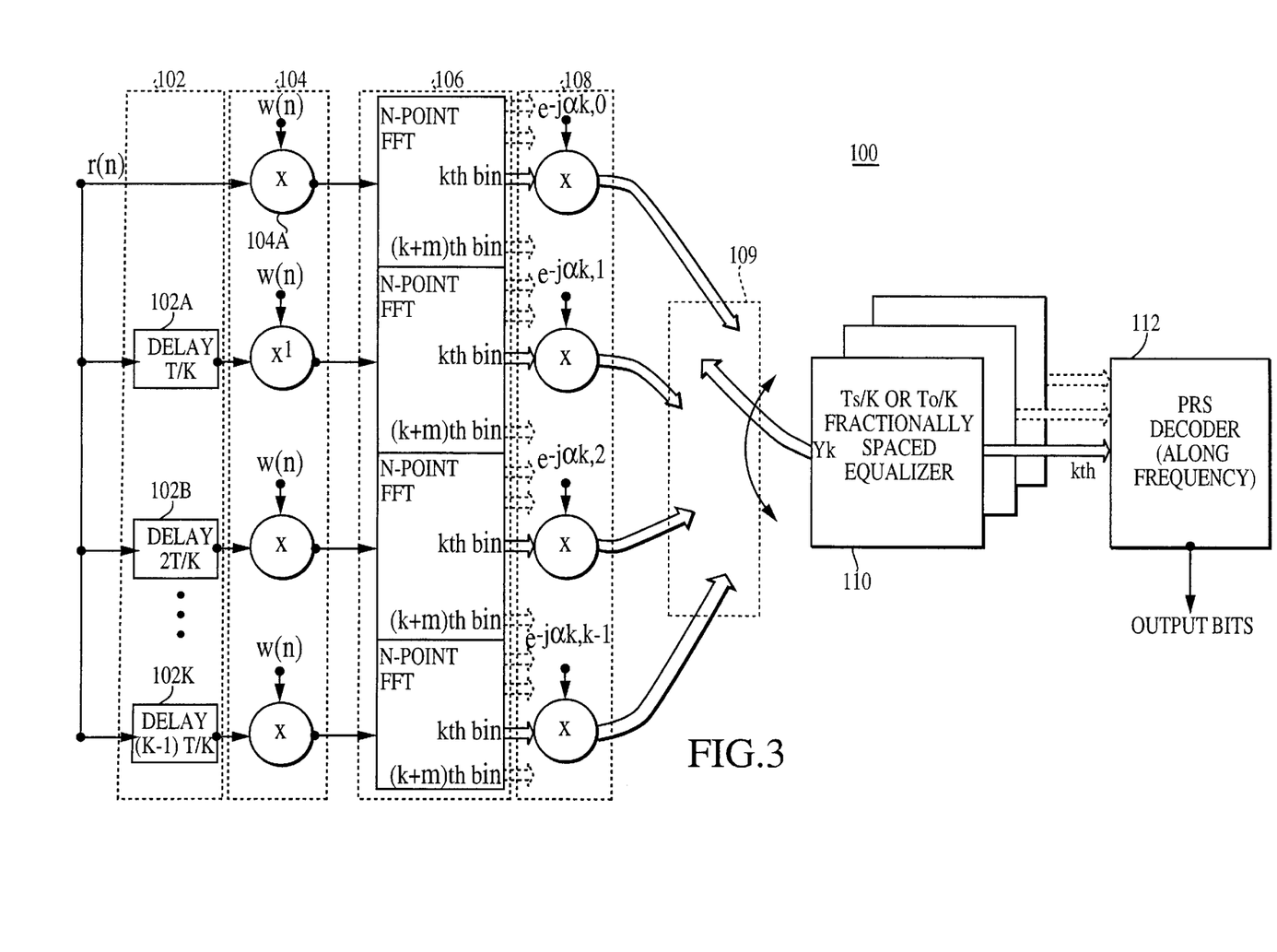
FIG. 3 is a block diagram of a discrete multi-tone receiver according to one aspect of the present invention.

Referring to the drawing wherein like numerals indicate like elements there is shown in FIG. 3 a block diagram of a discrete multi-tone receiver 100 in accordance with the present invention. The node labeled r(n) receives a DMT signal representative of a series of input symbols and includes a plurality of orthogonal sinusoidal subchannels of finite length for each input symbol. The received DMT signal is linearly distorted by a non-ideal transmission channel transfer characteristic. The received DMT signal may be considered as the output of an optional compromising corrector (substituted for the TEQ 32 of FIG. 1).

Those skilled in the art will appreciate that on the transmission side a transmission signal for DMT multi-tone signaling can be described as follows:

$$s(t) = \sum_{i=1}^{2} \sum_{k=0}^{N/2-1} \sum_{m=-\infty}^{\infty} \alpha_{i,k,m} \cdot \varphi_{i,k,m}(t), \quad (1)$$

$$\varphi_{i,k,m}(t) = \begin{cases} w_t(t-mT_s) \cdot \cos(2\pi \cdot f_k t), & \text{for } i = 1 \text{ and all } k; \\ -w_t(t-mT_s) \cdot \sin(2\pi \cdot f_k t), & \text{for } i = 2 \text{ and all } k. \end{cases} \quad (2)$$

The parameter Ts is the sum of the DMT orthogonality interval To and the cyclic prefix (time guard or guard band) interval Tg, where Ts is considered the symbol interval duration. In the sampled time domain context, each symbol contains N+V samples. The parameter $f_k$ is the K-th sub-channel central frequency defined by k/To. The variables $\alpha_{1,k,m}$ and $\alpha_{2,k,m}$ are the real and imaginary portions of symbols $\chi^k$ produced by modifying original complex data symbols $X^k$, where $X^k = a_{1,k,m} + j\, a_{2,k,m}$. Those skilled in the art will appreciate that the implied modification is obtained by multiplication with complex numbers with modulus 1, where the phase is incremented every symbol interval by an amount corresponding to the phase of a particular sub-carrier accumulated over the V samples of the guard-band interval. The original complex data symbol $X^k$ is transmitted during the m-th signaling interval in the k-th subchannel.

The receiver 100 includes a plurality of delay circuits 102, a plurality of time domain windowing circuits 104, a plurality of finite duration fast Fourier transform (FFT) circuits 106, a plurality of multiplier circuits 108, a fractionally spaced equalizer 110, and a partial response signaling decoder 112.

The delay circuits 102 are each operable to receive the DMT signal r(n) and produce delayed DMT signals at respective outputs. The details of suitable delay circuits for use in signal processing systems are well known to those skilled in the art. These delay circuits may be designed to delay an input signal by, for example, discrete time periods. When the DMT signal r(n) includes N samples spaced To/N seconds apart representing each input symbol, then each delay circuit may delay the DMT signal r(n) by a respective multiple of To/K (where K represents the number of delay circuits used). More particularly, the first delay circuit 102A may delay the DMT signal r(n) by To/K. The next delay circuit 102B may delay the DMT signal r(n) by 2*To/K, while the next delay circuit delays the DMT signal r(n) by 3*To/K, etc.

When the DMT signal r(n) includes N+V samples representing each input symbol (i.e., V samples representing a cyclic prefix for each input symbol) and the N+V samples are spaced Ts/(N+V) seconds apart, then each delay circuit preferably delays the DMT signal r(n) by a respective multiple (i.e., 1, 2, 3, . . . K–1) of Ts/K.

The plurality of time domain windowing circuits 104 are each operable to receive a respective one of the delayed DMT signals and produce a windowed DMT signal over To intervals. Preferably, a first one of the windowing circuits 104A receives a DMT signal r(n) which has not been delayed. The specific circuit details of the windowing circuits 104 are well known to those skilled in the art and need not be reiterated herein. It is preferred, however, that the windowing circuits are of the Hanning type. Indeed, because of relatively large side-lobes of a rectangularly shaped window spectra, better spectral containment may be achieved using the Hanning window. Of course, other types of windowing circuits may be employed (such as Kaiser, Hunning, Hamming, Prolate Spheroidal, PRS class IV and/or V related windowing, etc.) without departing from the scope of the invention.

The plurality of FFT circuits 106 are each operable to receive a respective one of the windowed DMT signals. Those skilled in the art are knowledgeable as to the details of FFT circuits and will appreciate that the FFT circuits produce complex signals having a plurality of bins corresponding to the subchannels of the DMT signal r(n). The continuous Fourier transform of the k-th bin (the samples of which are obtained at the k-th output of the FFT circuit 106) may be expressed in the following way:

$$R_k(\omega) = \left\{ \sum_{l=-L}^{L} \chi^{k+l}(e^{j(\omega+\omega_k-\omega_{k+1})T_s}) \cdot Q_{k+l,k}(\omega) \right\} H(\omega + \omega_k), \quad (3)$$

$$Q_{k+l,k}(\omega) = \frac{1}{2} \cdot W_t(\omega) \cdot W_r\left(\omega - l \cdot \frac{2\pi}{T_0}\right); \quad l = -L, \ldots -1, 0, 1, \ldots, L. \quad (4)$$

The parameter L denotes the number of sub-channels leftward and rightward of the k-th sub-channel contributing to its output as a result of the non-ideal transmission channel 20 (i.e., having a generally non-ideal transfer function H($\omega$)). $W_t(\omega)$ and $W_r(\omega)$ are spectral representations of the transmitter windowing circuit (rectangular) and the receiver windowing circuit, respectively. The terms of the equation in brackets { } is the Fourier transform of the k-th bin baseband demodulated signal, assuming an ideal transmission channel (i.e., a transmission channel containing neither inter-symbol nor inter-bin interference, H($\omega$)=1). Those skilled in the art, however, will appreciate that the term H($\omega+\omega_k$) represents the equivalent base-band channel transfer function in the range of the k-th sub-channel and produces inter-symbol and inter-bin interference if the transmission channel contains non-ideal characteristics within the frequency bandwidth of $f_k$+/–L/To.

Those skilled in the art will appreciate that only one FFT circuit 106 may be employed in a time shared manner to receive successive groups of the windowed DMT signals.

As shown in FIG. 3, a k-th bin of each FFT circuit 106 is input to a respective multiplier circuit 108. Each multiplier circuit 108 also receives a complex factor, for example, $e^{-j\alpha_{k,0}}$, $e^{-j\alpha_{k,1}}$, $e^{-j\alpha_{k,2}}$, etc. These complex factors are selected such that the phase shifts introduced by delay circuits 102 are compensated for. For example, $\alpha_{k,i} = 2\pi(i-1)K/N$ with equidistant sampling over To intervals. The inverses of these phase shifts tend to shift the frequency spectra from targeted base-band positions to other frequency ranges and, therefore, compensation should be employed.

Those skilled in the art will appreciate that multiplier circuits 108 (not shown) are also included such that each active output bin (e.g., the (k+m)-th bin) of the FFT circuits 106 for each delay branch be input into a respective multiplier circuit to produce an output which is phase compensated and demodulated to the targeted base-band position.

A multiplexing circuit 109 (for the k-th bins) preferably receives each of the outputs from the multiplier circuits 108 and sequentially inputs these signals into the fractionally spaced equalizer circuit 110 (for the k-th bin). In particular, the equalizer circuit 110 is operable to sequentially receive the products from the k-th bin of a first one of the FFT circuits 106, then receive the products from the k-th bin of a second one of the FFT circuits 106, and so on until each of the products of the k-th bins of the FFT circuits 106 are received by the fractionally spaced equalizer 110. In accordance with the invention, this produces an over sampled signal by a factor of K for the k-th bin (labeled $Y_k$) at the input of the equalizer circuit 110.

Those skilled in the art will appreciate that additional multiplexing circuits 109 (not shown) are utilized to sequentially receive products of other active bins (e.g., (k+m)-th bin) of the FFT circuits 106 to produce over sampled signals for other active bins (e.g., $Y_{(k+m)}$, etc.). These over sampled signals are input to fractionally spaced equalizers (not shown) for other active bins.

The equalizer circuit 110 (and the other equalizer circuits) produces an essentially partial response signaling (PRS) coded signal and the PRS decoder 112 receives the PRS coded signal and produces output symbols substantially corresponding to the symbols contained in the DMT signal r(n).

In accordance with the invention, it is desirable and advantageous to introduce a-low pass filter characteristic to each subchannel demodulator output having a transfer function substantially equal to the inverse of $H(\omega+\omega_k)$ in the relevant frequency range. This will substantially restore the orthogonality of the subchannels constituting the transmitted symbol. This low pass filter characteristic is introduced, for the k-th bin, by the fractionally spaced equalizer 110.

Figure 4:
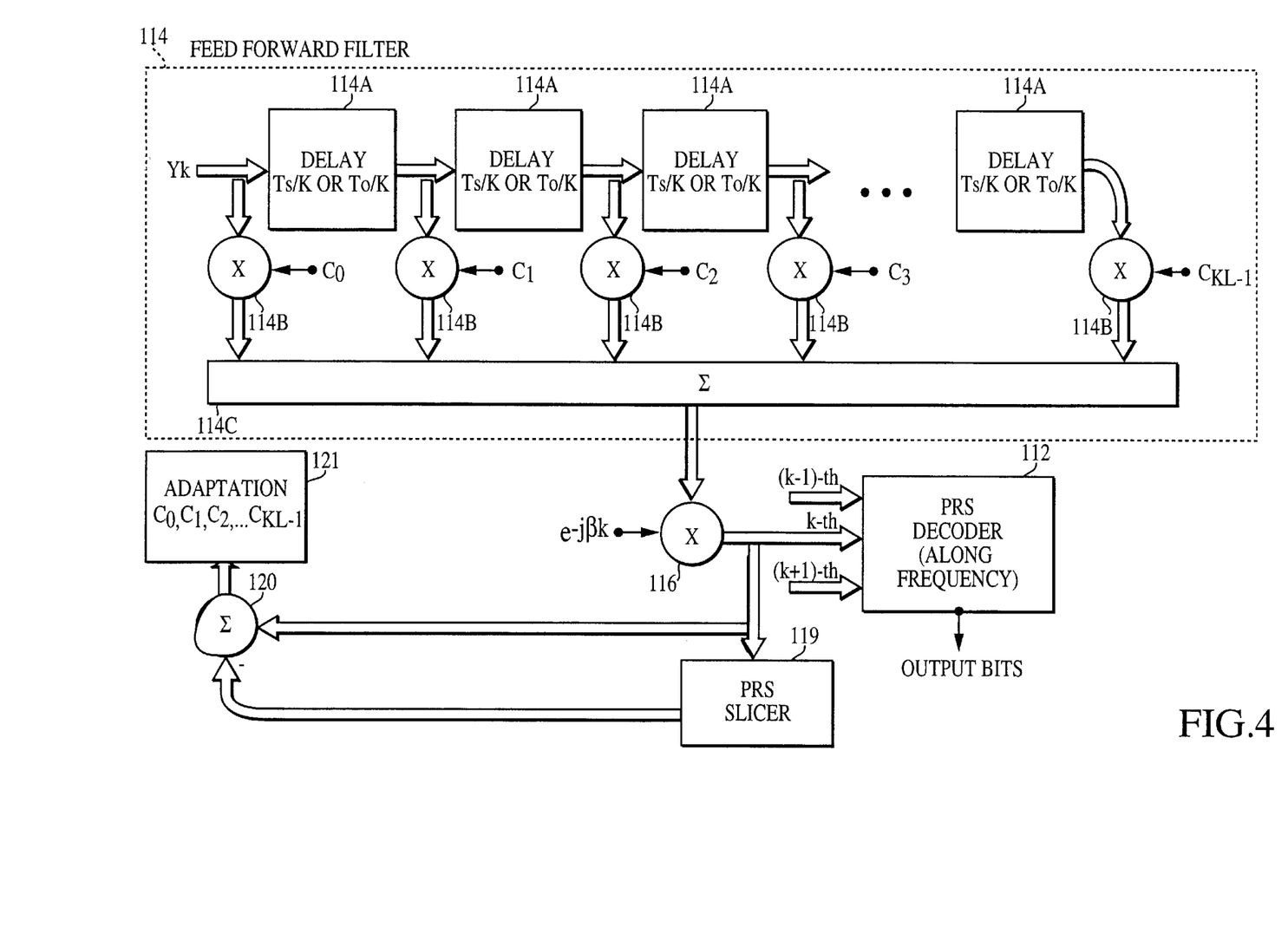
FIG. 4 is a block diagram illustrating a linear fractionally spaced equalizer during normal operation according to the present invention.

Reference is now made to FIG. 4 which is a block diagram illustrating an example of a linear circuit for implementing the fractionally spaced equalizer 110. In particular, the equalizer 110 includes a feed forward filter 114, a multiplier 116, a PRS slicer, and a summing circuit 120. The feed forward filter (FFF) 114 may be implemented by means of a finite impulse response (FIR) topology which includes a plurality of delay elements 114A, a plurality of multiplying circuits 114B and a summing circuit 114C. The multiplying circuits 114B receive respective coefficients $C_0$, $C_1$, $C_2$ ... $C_{KL-1}$, which scale the over sampled signal $Y_k$ and delayed representations thereof, and the scaled terms are aggregated by the summing circuit 114C. In order to realize a low-pass FFF filter having a bandwidth of -K/2*To to +K/2*To or -K/2*Ts to +K/2*Ts, the time spacing between filter taps should minimally be To/K or Ts/K, K being the over sampling factor of the over sampled signal $Y_k$. Thus, K defines the number of FFT outputs per To or Ts interval which should be calculated to feed the FFF filter 114 with input sample.

As discussed above, it is preferred that the time domain windowing circuits 104 (FIG. 3) are of the Hanning type because windowing circuits of the rectangular type (at the transmitter and at the receiver as is conventionally used) would require a very large over sampling factor (i.e., a high value of K). Hanning type time domain windowing circuits at the receiver (FIG. 3) permit a reasonable over sampling factor (e.g., up to K=4) to be used and the main lobe bandwidth ranging essentially from -2/To to +2/To Hz can be covered while achieving reasonable compensation of linear distortion (albeit at the expense of introducing controllable inter-bin interference). The resulting Q functions of equation (4) above may be expressed as follows:

$$Q_{k+l,k}(\omega) = \frac{1}{2} \cdot W_l(\omega) \cdot W_H\left(\omega - l \cdot \frac{2\pi}{T_0}\right); \quad l = -L, \ldots, -1, 0, 1, \ldots L, \quad (5)$$

where the index H denotes the spectral characteristics of Hanning windowing.

PRS type inter-bin interference will be obtained and PRS coefficients defined by normalized samples (i.e., $W_H(\omega)$) at frequencies of -1/To, 0, and +1/To, which have values of -0.5, 1, and -0.5, respectively, will result. This takes into account cross talk from neighboring bins with a weighting factor of -0.5. The output of the FFF filter 114, referred to as a forward filtered signal, is a PRS coded signal along the frequency axis (assuming properly adapted tap coefficients) since the over sampling factor K is sufficiently high and the FFF filter 114 will tend to substantially synthesize the equivalent LP inverse channel transfer function. Of course, the PRS coded reference must be known in advance or must be calculated in a decision directed mode (e.g., using LMS, RLS or other known adaptation algorithm) in order to properly adjust the coefficients $C_0$, $C_1$, $C_2$ ... $C_{KL-1}$.

The multiplier circuit 116 is operable to produce the PRS coded signal by multiplying a complex factor, for example $e^{-j\beta_k}$, to compensate for the cyclic prefix of each symbol. Indeed, multiplying the output of the FFF filter 114 by the complex factor $e^{-j\beta_k}$ is done to compensate for the phase accumulation over the V samples of the cyclic prefix. Demodulation by the factor $\exp(ja_{k,i})$ i=0, 1, 2, ... K-1, yields the complex LP signal with respect to a fixed carrier phase reference. At the transmitter, the QAM symbol-to-waveform mapping is performed with respect to a start of the it orothongality interval (i.e., the end of the cyclic prefix interval). Thus, $\beta_k$ should be defined as $2\pi V k/N$.

In order to adjust the FFF filter coefficients $C_0$, $C_1$, $C_2$ ... $C_{KL-1}$, a decision making circuit is employed which compares the PRS coded signal at the output of the multiplier 116 against a set of fixed thresholds and inputs that signal to the summing circuit 120. The PRS slicer 119 is operable to produce likely pertinent PRS signal levels for the k-th bin. The summing circuit 120 is operable to produce an error signal corresponding to the difference of the PRS coded signal and the PRS signal levels from the PRS slicer 119. The error signal is input into an adaptation circuit 121 (implementing any of the known techniques) to obtain the coefficients $C_0$, $C_1$, $C_2$ ... $C_{KL-1}$ of the FFF filter 114.

Those skilled in the art will appreciate that the FFF filter 114, multiplier circuit 116, PRS slicer circuit 119, summing circuit 120, and adaptation circuit 121 may be repeated to implement fractionally spaced equalizers for the other over sampled signals for other active bins (e.g., $Y_{(k+m)}$, etc.).

Figure 5:
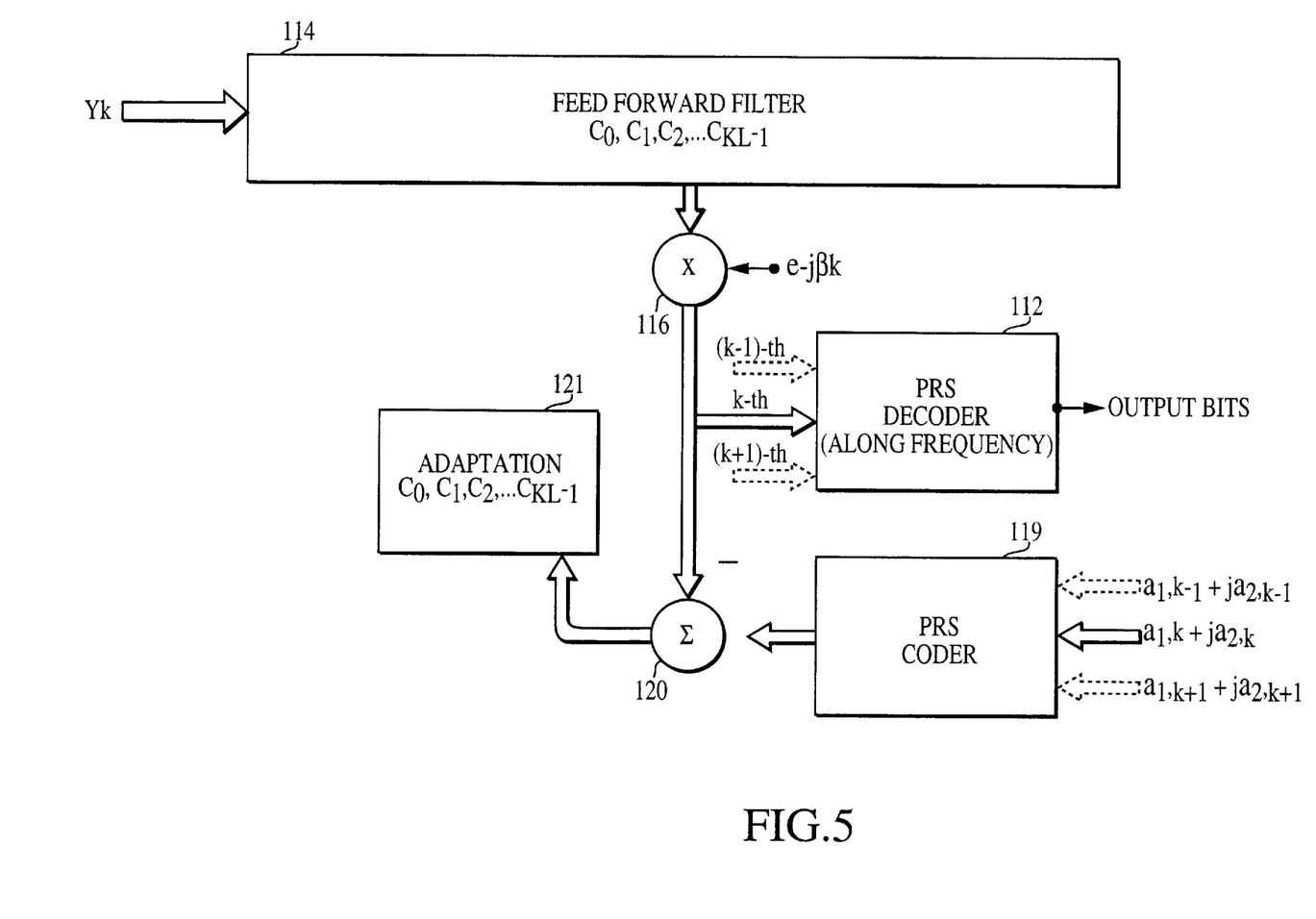
FIG. 5 is a block diagram illustrating the linear fractionally spaced equalizer configuration of FIG. 4 during a training phase according to the present invention.

Reference is now made to FIG. 5 which is a block diagram of the linear embodiment of the fractionally spaced equalizer 110 of FIG. 4 during a training phase for initially establishing the values of the coefficients $C_0$, $C_1$, $C_2$, ... $C_{KL-1}$. Here, the PRS coded signal from the multiplier circuit 116 is input into the summing circuit 120, a PRS coding circuit 119 receives a training (over sampled) signal of a known data symbol for (i) the k-th subchannel ($a_{1,k}+ja_{2,k}$); and (ii) neighboring subchannels k-1 and k+1 (for example). The summing circuit 120 is operable to produce a difference of the training PRS coded signal and the PRS coded signal, the difference producing an error signal which is input into an adaptation circuit 121 to produce the values of the coefficients $C_0$, $C_1$, $C_2$, ... $C_{KL-1}$.

It is preferred that the coefficients $C_0$, $C_1$, $C_2$, ... $C_{KL-1}$ be calculated on an intermittent basis and before actual data transmission. Those skilled in the art will appreciate that any of the known PRS coding circuits 119 may be employed; for example, frequency domain windowing techniques may be utilized.

Figure 6:
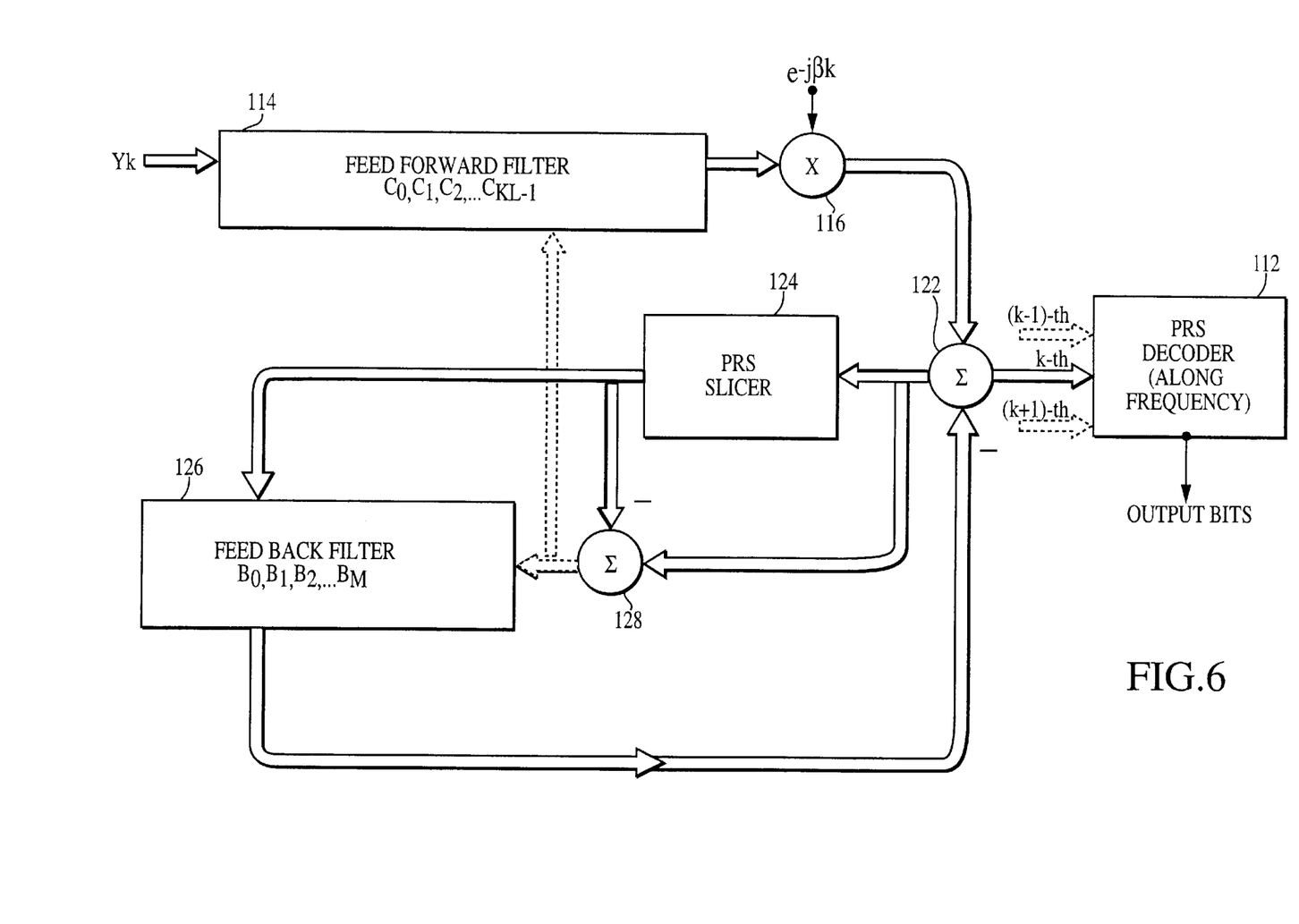
FIG. 6 is a block diagram illustrating a non-linear fractionally spaced equalizer configuration during normal operation according to another aspect of the invention.

Reference is now made to FIG. 6 which illustrates a block diagram of a non-linear decision feedback (DFB) circuit suitable for implementing the fractionally spaced equalizer 110 (FIG. 3). The non-linear DFB circuit includes a finite impulse response feed forward filter FFF 114, a multiplier circuit 116, a first summing circuit 122, a PRS slicer circuit 124, a finite impulse response feed back filter (FBF) 126, and a second summing circuit 128. The feed forward filter 114 includes a plurality of aggregated taps and is operable to receive the over sampled signal $Y_k$ (for the k-th bin) and produce a forward filtered signal which is input to the multiplier circuit 116. The multiplier circuit 116 is operable to multiply the forward filtered signal by a complex factor to produce a phase shifted signal for input to the first summing circuit 122. The first summing circuit 122 produces a difference signal corresponding to a difference between the phase shifted signal and a feedback filtered signal from the feedback filter 126. The PRS slicer circuit 124 is operable to receive the difference signal and produce PRS signal levels for the k-th bin.

The feedback filter 126 includes a plurality of aggregated taps (best seen in FIG. 7) and is operable to receive the PRS signal levels and produce the feedback filtered signal. The second summing circuit 128 is operable to produce an error signal corresponding to a difference of the difference signal from the first summing circuit 122 and the PRS signal levels from the PRS slicer 124. The second summing circuit 128 produces an error signal which is input into an adaptation circuit (not shown) to produce (i) the values of the coefficients $C_0, C_1, C_2, \ldots C_{KL-1}$ of the feed forward filter 114; and (ii) the values for coefficients of the feedback filter $B_0, B_1, B_2, \ldots B_M$.

Those skilled in the art will appreciate that the circuit of FIG. 6 may be replicated to equalize over sampled signals for other bins, such as the k−2, k−1, k+1, k+2 bins.

Figure 7:
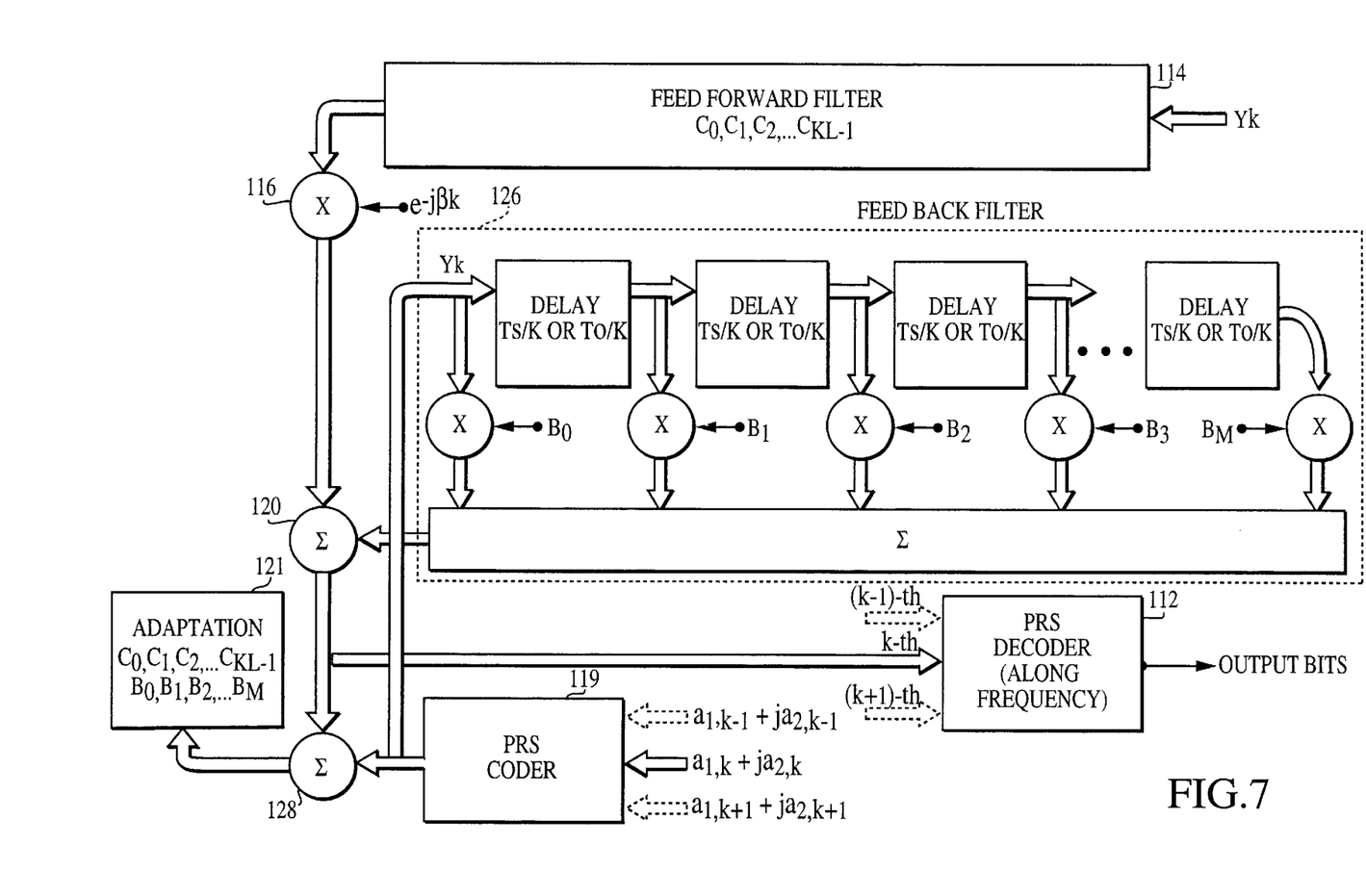
FIG. 7 is a block diagram illustrating the non-linear fractionally spaced equalizer configuration of FIG. 6 during a training phase according to the present invention.

Reference is now made to FIG. 7 which is a block diagram of the non-linear embodiment of the fractionally spaced equalizer 110 of FIG. 6 during a training phase for initially establishing the values of the coefficients $C_0, C_1, C_2, \ldots C_{KL-1}$ and $B_0, B_1, B_2, \ldots B_M$. Here, the PRS coded (and linearly distorted) signal from the multiplier circuit 116 is input into the first summing circuit 120. A PRS coding circuit 119 receives a training over sampled signal of a known data symbol for (i) the k-th subchannel $(a_{1,k}+ja_{2,k})$; and (ii) neighboring subchannels k−1 and k+1 (for example). The second summing circuit 128 is operable to produce a difference of the training PRS coded signal and the PRS coded signal, the difference producing an error signal which is input into an adaptation circuit 121 to obtain the values of the coefficients $C_0, C_1, C_2, \ldots C_{KL-1}$ of the feed forward filter 114 and the values for coefficients of the feedback filter $B_0, B_1, B_2, \ldots B_M$.

It is preferred that the coefficients $C_0, C_1, C_2, \ldots C_{KL-1}$ and $B_0, B_1, B_2 \ldots B_M$ be calculated on an intermittent basis and before actual data transmission. Those skilled in the art will appreciate that any of the known PRS coding circuits 119 may be employed; for example, frequency domain windowing techniques may be utilized.

Figure 8:
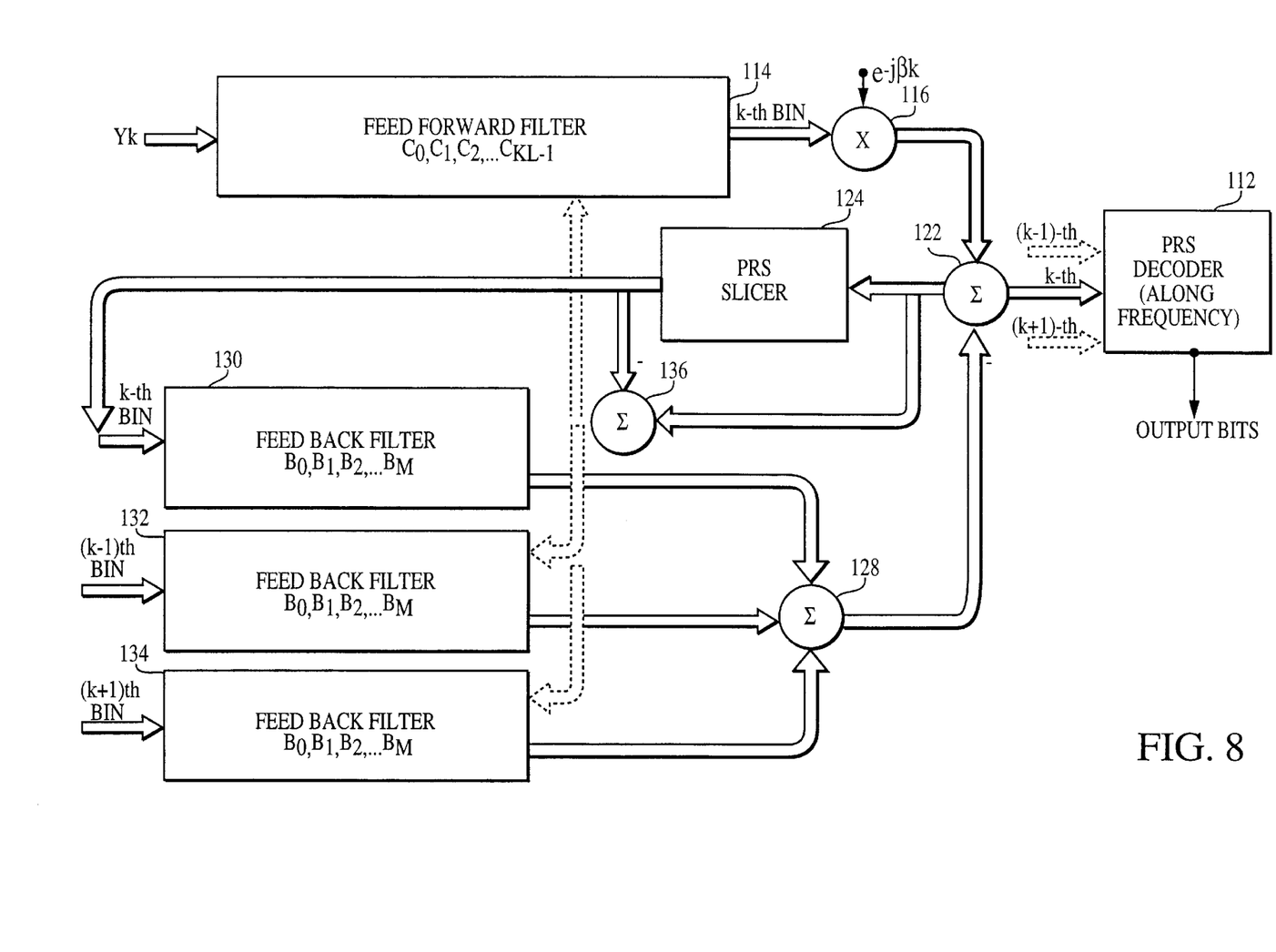
FIG. 8 is a block diagram of an alternative embodiment of a non-linear fractionally spaced equalizer configuration during normal operation.

Reference is now made to FIG. 8 which illustrates an alternative embodiment of the non-linear fractionally spaced equalizer 110 (FIG. 3). The equalizer circuit includes a finite impulse response feed forward filter 114, a multiplier circuit 116, a first summing circuit 122, a PRS slicer circuit 124, first, second, and third finite impulse response feedback filters 130, 132, 134, respectively, a second summing circuit 128, and a third summing circuit 136.

The first feedback filter 130 preferably receives data from the k-th bin, while the second feedback filter 132 receives data from the (k−1)-th bin (PRS. slicer not shown) and the third feedback filter 134 receives data from the (k+1)-th bin (PRS slicer not shown). The feedback filtered signals from the first, second, and third FBFs 130, 132, and 134 are aggregated by the second summing circuit 128 to produce an aggregated filtered feedback signal.

The third summing circuit 136 is operable to produce an error signal corresponding to a difference of the difference-signal (output of summing circuit 122) and the PRS signal levels (output of PRS slicer circuit 124) to produce an error signal. The error signal is input to an adaptation circuit (not shown) which produces the values for the coefficients for the taps of the feed forward filter 114 and the first, second, and third feedback filters 130, 132 and 134.

Those skilled in the art will appreciate that the PRS decoders of the above embodiments may be implemented using any of the known techniques, for example, a decision feedback decoder, a maximum likelihood sequence estimator, a Viterbi decoder, and/or a decision feedback decoder of the type disclosed in U.S. patent application Ser. No. 09/288,478, entitled RECEIVER FOR DISCRETE MULTI-TONE MODULATED SIGNALS HAVING WINDOW FUNCTION, filed Apr. 8, 1999, the entire disclosure of which is hereby incorporated by reference. Any of these PRS decoder techniques may be employed irrespective of which windowing technique is employed in the receiver. The PRS decoding reduces to decision feedback equalization (DFE) when the TEQ coefficients are unity. The PRS decoding can be performed independently on the real and imaginary parts of the complex PRS samples. Thus, optimal MLSE decoding in case of the present invention compensates for most windowing related degradation with reduced complexity as compared to MLSE decoding when a TEQ is employed.

Figure 9:
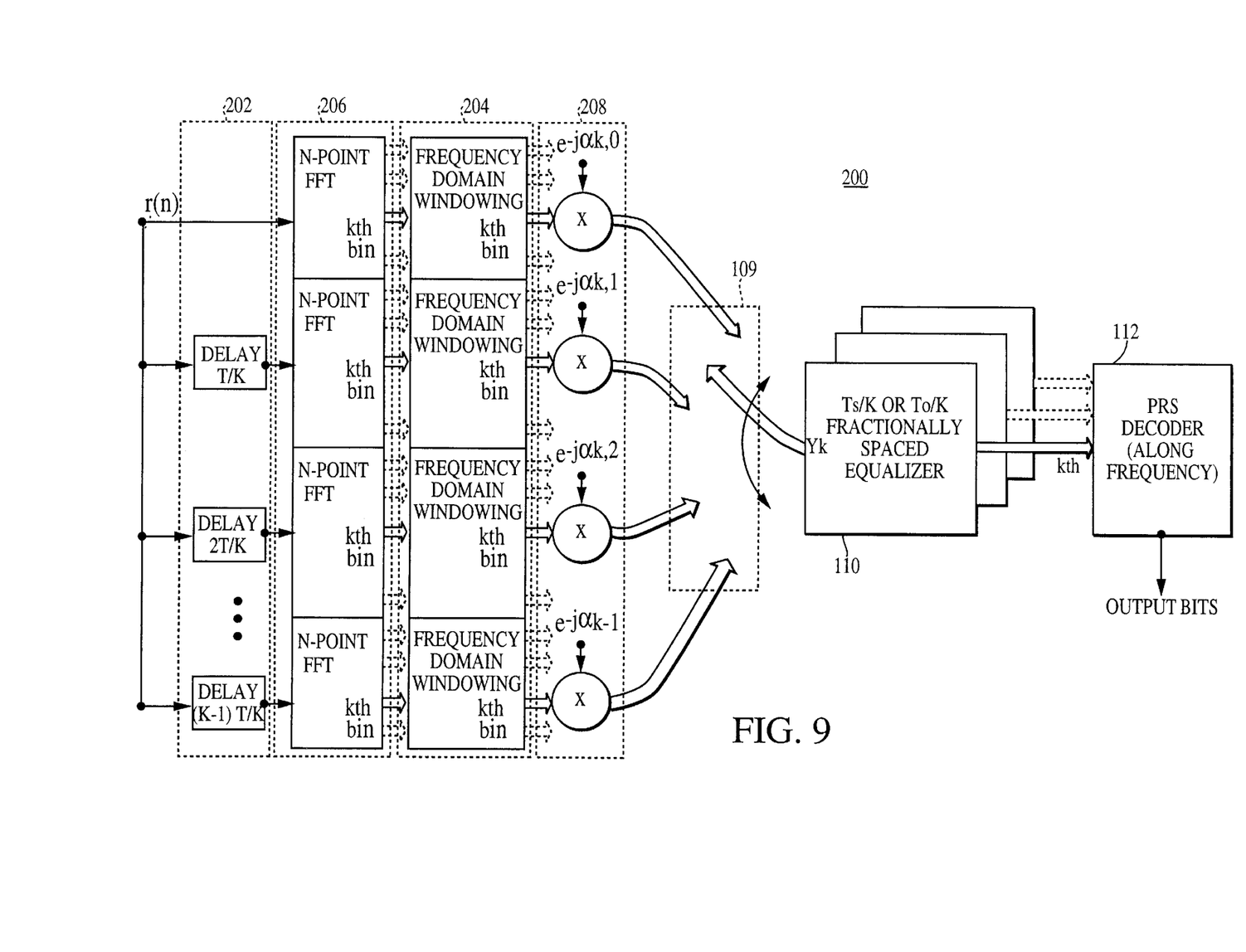
FIG. 9 is a block diagram of a discrete multi-tone receiver according to another aspect of the present invention.

Reference is now made to FIG. 9 which illustrates an alternative embodiment for a discrete multi-tone receiver 200 in accordance with the present invention. Those skilled in the art will appreciate that windowing is accomplished in the frequency domain as opposed to the time domain windowing configuration of FIG. 3. The receiver 200 includes a plurality of delay circuits 202, a plurality of finite duration fast Fourier transform (FFT) circuits 206, a plurality of frequency domain windowing circuits 204, a plurality of multiplier circuits 208, a fractionally spaced equalizer 110, and a partial response signaling decoder 112.

The delay circuits 202 are substantially similar to the delay circuits 102 of FIG. 3 and are each operable to receive the DMT signal r(n) and produce delayed DMT signals (samples) at respective outputs. The plurality of FFT circuits 206 are substantially similar to the FFT circuits 106 of FIG. 3 and are each operable to receive a respective one of the delayed DMT signals. Preferably, a first one of the FFT circuits 206 receives a DMT signal r(n) which has not been delayed.

Those skilled in the art will appreciate that one FFT circuit 206 may be employed in time shared fashion to receive successive groups of the delayed DMT signals.

The plurality of frequency domain windowing circuits 204 are each operable to receive respective bins from the FFT circuits 206 and produce windowed DMT signals. The specific circuit details of the frequency domain windowing circuits 204 are well known to those skilled in the art and need not be reiterated herein. A k-th bin of each frequency domain windowing circuit 204 is input to a respective multiplier circuit 208. Each multiplier circuit 208 also receives a complex factor, for example, $e^{-j\alpha_{k,0}}$, $e^{-j\alpha_{k,1}}$, $e^{-j\alpha_{k,2}}$, etc. These complex factors are selected such that the phase shifts introduced by delay circuits 102 are compensated for. Indeed, these phase shifts tend to shift the frequency spectra from its base band position to other frequencies and should be adjusted for.

It is preferred that each active bin of the frequency domain windowing circuits 204 be input into a respective multiplier circuit to produce an output which is phase compensated.

A multiplexing circuit 109 preferably receives each of the outputs from the multiplier circuits 208 and sequentially inputs these signals into the fractionally spaced equalizer circuit 110. In particular, the equalizer circuit 110 is operable to sequentially receive the product from the k-th bin of a first frequency domain windowing circuit 204, then receive the product of the k-th bin of a second frequency domain windowing circuit 204, and so on until each of the products of the k-th bins of the frequency domain windowing circuits 204 are also received by the fractionally spaced equalizer 112. In accordance with the invention, this produces an over sampled signal $Y_k$ at the input of the equalizer circuit 110.

Those skilled in the art will appreciate that additional multiplexing circuits 109 (not shown) are utilized to sequentially receive products of other active bins (e.g., (k+m)-th bins) of the windowing circuits 204 to produce over sampled signals for other active bins (e.g., $Y_{(k+m)}$, etc.). These over sampled signals are input to fractionally spaced equalizers (not shown) for other active bins.

The equalizer circuit 110 produces a partial response signaling (PRS) coded signal and the PRS decoder 112 receives the PRS coded signal and produces output symbols substantially corresponding to the transmitted symbols contained in the DMT signal r(n).

In accordance with the invention, any of the equalizer implementations discussed above (FIGS. 4–8) may be used with the receiver of FIG. 9.

Advantageously, the equalization technique of the present invention largely overcomes the limitations of conventional time domain equalizer methods and permits the use of a higher number of useable subchannels under harsh transmission conditions. Further, the invention provides an improved DMT communication system which is capable of (i) adaptively compensating for time variations in the communications channel transfer function; (ii) compensating for inter and intra bin interference; and (iii) adaptive notching narrow-band radio frequency interference from the received DMT signal; and (iv) low complexity optimal decoding of non-rectangular windowing induced inter-bin (inter subchannel) interference.

These improvements are obtained at a cost of reduced performance during benign transmission conditions, with the complexity required not higher than for TEQ equalization and windowing in DMT receivers. In particular, the present invention is advantageous in view of the complexities involved in TEQ equalization (and windowing) for the "up-stream" direction in xDSL data transmission.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus for receiving a discrete multi-tone (DMT) signal representative of a series of input symbols and including a plurality of orthogonal sinusoidal subchannels of finite length for each input symbol, the apparatus comprising:

a plurality of delay circuits, each operable to receive the DMT signal and produce a delayed DMT signal;

a plurality of windowing circuits, each operable to receive a respective one of the delayed DMT signals and produce a windowed DMT signal;

at least one finite duration fast Fourier transform (FFT) circuit, operable to receive the windowed DMT signals and produce respective complex signals representing a plurality of bins corresponding to the subchannels of the DMT signal;

a plurality of multiplier circuits, each operable to produce a product of (i) a complex factor for compensating for a respective-phase shift introduced by a corresponding one of the delay circuits, and (ii) a respective one of the complex signals;

an equalizer circuit operable to receive the products from the plurality of multiplier circuits and produce a partial response signaling (PRS) coded signal; and a PRS decoder operable to receive the PRS coded signal and produce output symbols representative of the input symbols.

2. The apparatus of claim 1, comprising 1,2,3, through (K–1) delay circuits, wherein one of the windowing circuits is operable to receive the DMT signal which has not been delayed.

3. The apparatus of claim 2, wherein:

the DMT signal includes N samples spaced To/N seconds apart representing each input symbol, and each delay circuit delays the DMT signal by a respective multiple of 1,2,3, through (K–1) times To/K.

4. The apparatus of claim 2, wherein:

the DMT signal includes N samples representing each input symbol and V samples representing a cyclic prefix for each input symbol, the N+V samples being spaced Ts/(N+V) seconds apart, and each delay circuit delays the DMT signal by a respective multiple of 1,2,3, through (K–1) times Ts/K.

5. The apparatus of claim 1, wherein each of the windowing circuits is a Hanning type window.

6. The apparatus of claim 1, wherein active bins of the at least one FFT circuit are input into respective ones of the multiplier circuits and multiplied by a respective one of the complex factors.

7. The apparatus of claim 1, wherein the equalizer circuit is operable to sequentially receive k-th products from the multiplier circuits of k-th bins to produce an over sampled signal for a k-th one of the subchannels of the DMT signal.

8. The apparatus of claim 1, wherein the equalizer circuit is a linear circuit comprising:

a finite impulse response feed forward filter (FFF) having K*L aggregated taps and being operable to receive the over sampled signal and produce a forward filtered signal;

a multiplier circuit operable to produce the PRS coded signal by multiplying (i) a complex factor for compensating for a cyclic prefix of each symbol, and (ii) the forward filtered signal;

a PRS slicer circuit operable to receive the PRS coded signal and produce PRS signal levels for each bin; and a first summing circuit operable to produce an error signal corresponding to a difference of the PRS coded signal and the PRS signal levels, the error signal being used to adaptively produce coefficients for the taps of the FFF.

9. The apparatus of claim 8, further comprising an adaptive circuit operable to produce FFF coefficients during a training phase, the adaptive circuit comprising a PRS coding circuit operable to receive a training signal of known symbols to produce a training PRS coded signal, wherein the summing circuit is operable to produce an error signal corresponding to a difference of the training PRS coded signal and the PRS coded signal, the error signal being used to adaptively produce the FFF coefficients for the taps of the FFF.

10. The apparatus of claim 9, wherein the adaptive circuit is operable to produce the FFF coefficients intermittently.

11. The apparatus of claim 9, wherein the PRS coding circuit comprises at least one frequency domain windowing circuit.

12. The apparatus of claim 1, wherein the equalizer circuit is a non-linear circuit comprising:
a finite impulse response feed forward filter (FFF) having a plurality of aggregated taps and being operable to receive the over sampled signal and produce a forward filtered signal;
a multiplier circuit operable to produce a phase shifted signal by multiplying (i) a complex factor for compensating for a cyclic prefix of each symbol, and (ii) the forward filtered signal;
a first summing circuit operable to produce a difference signal corresponding to a difference of the phase shifted signal and a feedback filtered signal;
a PRS slicer circuit operable to receive the difference signal and produce PRS signal levels for each bin;
a finite impulse response feed back filter (FBF) having a plurality of aggregated taps and being operable to receive-the PRS signal levels and produce the feedback filtered signal; and
a second summing circuit operable to produce an error signal corresponding to a difference of the difference signal and the PRS signal levels, the error signal being used to adaptively produce the coefficients for the taps of the FFF and the FBF.

13. The apparatus of claim 12, further comprising an adaptive circuit operable to produce FFF coefficients and FBF coefficients during a training phase, the adaptive circuit comprising a PRS coding circuit operable to receive a training signal of known symbols to produce a training PRS coded signal, wherein the second summing circuit is operable to produce an error signal corresponding to a difference of the difference signal and the PRS coded signal, the error signal being used to produce the adaptive FFF coefficients for the taps of the FFF and the FBF coefficients for the taps of the FBF.

14. The apparatus of claim 13, wherein the adaptive circuit is operable to produce the FFF coefficients and the FFF coefficients intermittently.

15. The apparatus of claim 13, wherein the PRS coding circuit comprises at least one frequency domain windowing circuit.

16. The apparatus of claim 1, wherein the equalizer circuit is a non-linear circuit which includes decision feedback, the equalizer circuit comprising:
a finite impulse response feed forward filter (FFF) having a plurality of aggregated taps and being operable to receive the over sampled signal and produce a forward filtered signal;
a multiplier circuit operable to produce a phase shifted signal by multiplying (i) a complex factor for compensating for a cyclic prefix of each symbol, and (ii) the forward filtered signal;
a first summing circuit operable to produce a difference signal corresponding to a difference of the phase shifted signal and an aggregate feedback filtered signal;
a PRS slicer circuit operable to receive the difference signal and produce PRS signal levels for each bin;
a first finite impulse response feed back filter (FBF) having a plurality of aggregated taps and being operable to receive the PRS signal levels for a k-th bin and produce a first feedback filtered signal;
a second FBF having a plurality of aggregated taps and being operable to receive the PRS signal levels for a (k−1)th bin and produce a second feedback filtered signal;
a third FBF having a plurality of aggregated taps and being operable to receive the PRS signal levels for a (k+1)th bin and produce a third feedback filtered signal;
a second summing circuit operable to produce the aggregate filtered feedback signal by summing the first, second, and third feedback filtered signals; and
a third summing circuit operable to produce an error signal corresponding to a difference of the difference signal and the PRS signal levels, the error signal being used to produce the coefficients for the taps of the FFF and the first, second, and third FBFs.

17. The apparatus of claim 1, wherein the PRS decoder includes at least one of (i) a decision feedback decoder; (ii) a maximum likelihood sequence estimator; and (iii) a Viterbi decoder.

18. An apparatus for receiving a discrete multi-tone (DMT) signal representative of a series of input symbols and including a plurality of orthogonal sinusoidal subchannels of finite length for each input symbol, the apparatus comprising:
a plurality of delay circuits, each operable to receive the DMT signal and produce a delayed DMT signal;
at least one time-shared finite length fast Fourier transform (FFT) circuit, operable to receive the delayed DMT signals and produce respective complex signals representing a plurality of bins corresponding to the subchannels of the DMT signal;
a plurality of frequency domain windowing circuits, each operable to receive a respective one of the complex signals and produce a windowed complex signal;
a plurality of multiplier circuits, each operable to produce a product of (i) a complex factor for compensating for a respective delay circuit, and (ii) a respective one of the windowed complex signals;
an equalizer circuit operable to receive the products from the plurality of multiplier circuits and produce a partial response signaling (PRS) coded signal; and
a PRS decoder operable to receive the PRS coded signal and produce output symbols representative of the input symbols.

19. The apparatus of claim 18, comprising 1,2,3, through (K−1) delay circuits, wherein one of the FFT circuits is operable to receive the DMT signal which has not been delayed.

20. The apparatus of claim 19, wherein:
the DMT signal includes N samples spaced To/N seconds apart representing each input symbol, and
each delay circuit delays the DMT signal by a respective multiple of 1,2,3, through (K−1) times To/K.

21. The apparatus of claim 19, wherein:
the DMT signal includes N samples representing each input symbol and V samples representing a cyclic prefix for each input symbol, the N+V samples being spaced Ts/(N+V) seconds apart, and
each delay circuit delays the DMT signal by a respective multiple of 1,2,3, through (K−1) times Ts/K.

22. The apparatus of claim 18, wherein active bins of the frequency domain windowing circuits are input into respective ones of the multiplier circuits and multiplied by a respective one of the complex factors.

23. The apparatus of claim 18, wherein the equalizer circuit is operable to sequentially receive k-th products from the multiplier circuits to produce an over sampled signal for a k-th one of the subchannels of the DMT signal.

24. The apparatus of claim 18, wherein the equalizer circuit is a linear circuit comprising:

a finite impulse response feed forward filter (FFF) having K*L aggregated taps and being operable to receive the over sampled signal and produce a forward filtered signal;

a multiplier circuit operable to produce the PRS coded signal by multiplying (i) a complex factor for compensating for a cyclic prefix of each symbol, and (ii) the forward filtered signal;

a PRS slicer circuit operable to receive the PRS coded signal and produce PRS signal levels for each bin; and a first summing circuit operable to produce an error signal corresponding to a difference of the PRS-coded signal and the PRS signal levels, the error signal being used to produce coefficients for the taps of the FFF.

25. The apparatus of claim 24, further comprising an adaptive circuit operable to produce FFF coefficients during a training phase, the adaptive circuit comprising a PRS coding circuit operable to receive a training signal of known symbols to produce a training PRS coded signal, wherein the summing circuit is operable to produce the error signal corresponding to a difference of the training PRS coded signal and the PRS coded signal, the error signal being used to produce the adaptive FFF coefficients for the taps of the FFF.

26. The apparatus of claim 25, wherein the adaptive circuit is operable to produce the FFF coefficients intermittently.

27. The apparatus of claim 25, wherein the PRS coding circuit comprises at least one frequency domain windowing circuit.

28. The apparatus of claim 18, wherein the equalizer circuit is a non-linear circuit comprising:

a finite impulse response feed forward filter (FFF) having a plurality of aggregated taps and being operable to receive the over sampled signal and produce a forward filtered signal;

a multiplier circuit operable to produce a phase shifted signal by multiplying (i) a complex factor for compensating for a cyclic prefix of each symbol, and (ii) the forward filtered signal;

a first summing circuit operable to produce a difference signal corresponding to a difference of the phase shifted signal and a feedback filtered signal;

a PRS slicer circuit operable to receive the difference signal and produce PRS signal levels for each bin;

a finite impulse response feed back filter (FBF) having a plurality of aggregated taps and being operable to receive the PRS signal levels and produce the feedback filtered signal; and a second summing circuit operable to produce an error signal corresponding to a difference of the difference signal and the PRS signal levels, the error signal being used to produce the coefficients for the taps of the FFF and the FBF.

29. The apparatus of claim 28, further comprising an adaptive circuit operable to produce FFF coefficients and FBF coefficients during a training phase, the adaptive circuit comprising a PRS coding circuit operable to receive a training signal of known symbols to produce a training PRS coded signal, wherein the second summing circuit is operable to produce an error signal corresponding to a difference of the difference signal and the PRS coded signal, the error signal being used to produce the adaptive FFF coefficients for the taps of the FFF and the FBF coefficients for the taps of the FBF.

30. The apparatus of claim 29, wherein the adaptive circuit is operable to produce the FFF coefficients and the FFF coefficients intermittently.

31. The apparatus of claim 29, wherein the PRS coding circuit comprises at least one frequency domain windowing circuit.

32. The apparatus of claim 18, wherein the equalizer circuit is a non-linear circuit which includes decision feedback, the equalizer circuit comprising:

a finite impulse response feed forward filter (FFF) having a plurality of aggregated taps and being operable to receive the over sampled signal and produce a forward filtered signal;

a multiplier circuit operable to produce a phase shifted signal by multiplying (i) a complex factor for compensating for a cyclic prefix of each symbol, and (ii) the forward filtered signal;

a first summing circuit operable to produce a difference signal corresponding to a difference of the phase shifted signal and an aggregate feedback filtered signal;

a PRS slicer circuit operable to receive the difference signal and produce PRS FV signal levels for each bin;

a first finite impulse response feed back filter (FBF) having a plurality of aggregated taps and being operable to receive the PRS signal levels for a k-th bin and produce a first feedback filtered signal;

a second FBF having a plurality of aggregated taps and being operable to receive the PRS signal levels for a (k−1)th bin and produce a second feedback filtered signal;

a third FBF having a plurality of aggregated taps and being operable to receive the PRS signal levels for a (k+1)th bin-and produce a third feedback filtered signal;

a second summing circuit operable to produce the aggregate filtered feedback signal by summing the first, second, and third feedback filtered signals; and a third summing circuit operable to produce an error signal corresponding to a difference of the difference signal and the PRS signal levels, the error signal being used to produce the coefficients for the taps of the FFF and the first, second, and third FBFs.

33. The apparatus of claim 18, wherein the PRS decoder includes at least one of (i) a decision feedback decoder; (ii) a maximum likelihood sequence estimator; and (iii) a Viterbi decoder.

* * * * *